July 3, 1962 L. A. BIXBY 3,042,145
AXLE OUTER END
Original Filed Nov. 29, 1956 3 Sheets-Sheet 1

INVENTOR
LEO A. BIXBY

BY

ATTORNEYS

July 3, 1962 L. A. BIXBY 3,042,145
AXLE OUTER END
Original Filed Nov. 29, 1956 3 Sheets-Sheet 2

INVENTOR
Leo A. Bixby
BY Strauch, Nolan & Neale
ATTORNEYS

INVENTOR
Leo A. Bixby

3,042,145
AXLE OUTER END

Leo A. Bixby, Niles, Mich., assignor to Rockwell-Standard Corporation, Coraopolis, Pa., a corporation of Pennsylvania
Continuation of application Ser. No. 625,095, Nov. 29, 1956. This application May 20, 1960, Ser. No. 30,689
10 Claims. (Cl. 184—6)

This invention relates to improvements in vehicle drives and particularly to improvements in planetary gear axle outer end constructions.

In the design of planetary axle outer ends it is necessary that the wheel bearings be of adequate size for the load imposed but as small as possible. Smaller wheel bearing sizes make it possible to use smaller gear reductions resulting in smaller and lighter outer end assemblies and thus permitting use of larger and more adequate brakes. For any given load, bearing sizes may be minimized by using liquid lubricants such as oil rather than solid lubricants such as grease as has been customary heretofore. Examples of prior constructions of this general type are found in copending application Serial No. 303,658 filed August 11, 1952, by L. R. Buckendale for Vehicle Drive Mechanism now Patent No. 2,763,160.

The primary object of this invention is, therefore, to provide a new improved axle planetary gear outer end embodying novel means for lubricating the wheel bearings by oil rather than grease.

Another object is to provide a planetary axle outer end adapted to be lubricated by liquid lubricant by the provision of oil distributing means for feeding oil to and retaining it in the space between wheel bearings without reverse oil flow through the oil entrance channel during wheel rotation.

A further object is to provide an oil lubricated planetary axle outer end assembly embodying an oil reservoir in the planetary gear housing and means for taking oil from the surface and near the surface of the oil in the axle outer end planetary gear housing reservoir and supplying oil to the wheel bearings.

Another object is to provide a planetary axle outer end assembly embodying a nut threaded on the end of an axle housing spindle that provides the wheel bearing adjustment and holds a planetary ring gear hub mount member on the spindle and improved nut locking means which extend through slots in the axle housing spindle extension and slots in the nut.

Another object is to provide internal planetary ring gear and hub mount of such construction that the ring gear is axially confined without radial restraint whereby resilient deformation of the ring gear under pinion loading will be uniform across the axial dimensions of the ring gear.

Further objects of the present invention will become apparent from the following description, when considered in connection with the accompanying drawings and the appended claims.

In the drawings which illustrate two simple and practical embodiments of the invention:

Figure 1:
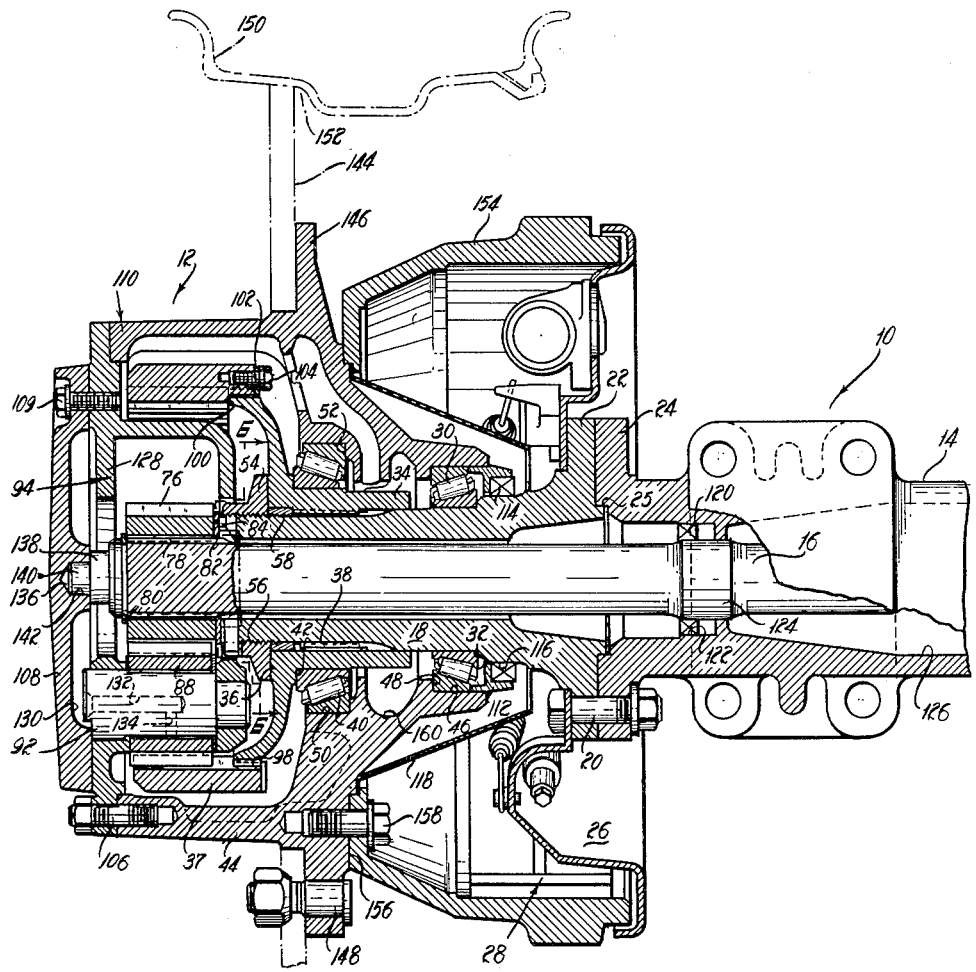
FIGURE 1 is a fragmentary partially sectioned top view of a drive axle with planetary gear outer ends embodying the principles of the present invention.

With reference to the drawings and particularly to FIGURE 1, axle 10 is equipped at each end with a planetary gear outer end assembly 12 and has an axle housing 14 containing a differential connected rotatable axle shaft 16. An axially outwardly extending hollow spindle 18 is fixed to the end of axle housing 14 in surrounding relation to shaft 16 by suitably circumferentially spaced bolt assemblies 20 rigidly connecting mating flanges 22 and 24 on spindle 18 and housing 14 and which are piloted in concentric alignment at 25. A brake backing plate 26 for brake assembly 28 is secured to spindle flange 22 by bolts 29. Spindle 18 supports the inboard wheel bearing 30, its inner race being an axial abutment with spindle shoulder 32.

The hub 34 of mounting member 36 for planetary ring gear 37 is internally splined at 38 to spindle 18 and supports the outboard wheel bearing 40 with its inner race in abutment with shoulder 42 thereof. Opposed tapered roller type anti-friction bearings 30 and 40 journal the wheel hub 44, bearing 30 being received in end bore 46 of hub 44 with its outer race in abutment with shoulder 48 and bearing 40 being received in the opposite end bore 50 of hub 44 with its outer race in abutment with shoulder 52. A nut 54, which is threaded at 56 on the outer end of spindle 18 may be manipulated to adjust the preloading of wheel bearings 30 and 40 and holds the ring gear support member 36 in axially fixed relation on spindle 18. An annular bushing spacer 58 is received within the end of the bore of the hub of member 36 between the end of its internal splines 38 and the adjacent face of nut 54 in surrounding relation to spindle 18 to maintain a fixed concentricity between member 36 and spindle 18.

Figure 5:
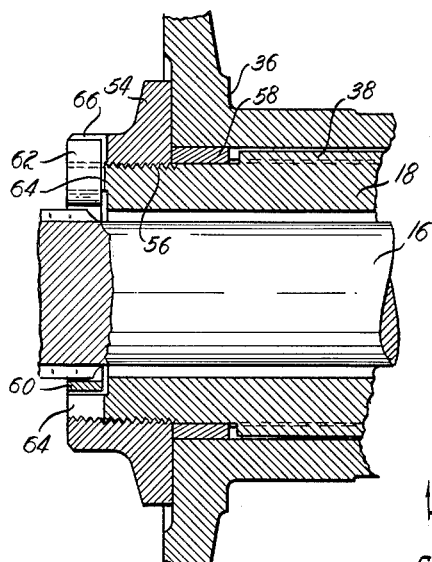
FIGURE 5 is a fragmentary diametral sectional view taken along the line 5—5 of FIGURE 6 and illustrating a nut threaded to the end of an axle housing spindle extension and nut locking means.
Figure 6:
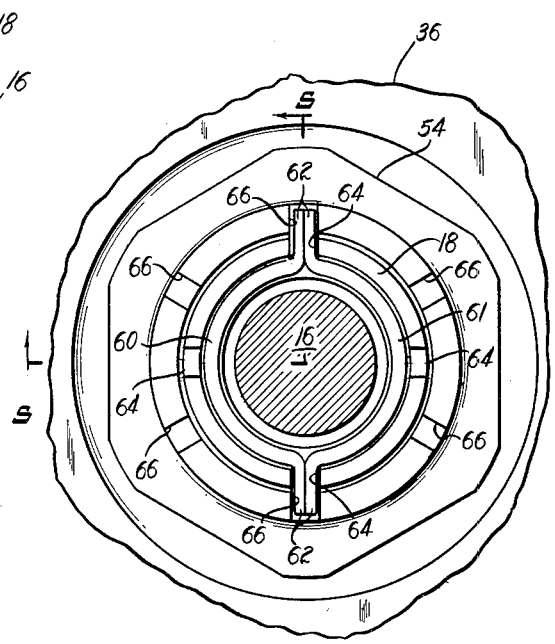
FIGURE 6 is a sectional end view of the nut and nut locking means taken along the line 6—6 of FIGURE 1.

Referring also to FIGURES 5 and 6, nut 54 is locked against rotation in its adjusted position on threads 56 of spindle 18 by two semi-circular stampings 60 and 61 each of which is formed with an arcuate portion terminating in radially extending flanged ends 62 which project radially through diametrically opposed radial slots 64 in the end face of spindle 18 and through aligned radially extending slots 66 in the end face of the integral hub of nut 54. The end face of nut 54 has three diametrically opposed equiangularly spaced pairs of slots 66 and the end face of spindle 18 has two equiangularly spaced pairs of diametrically opposed slots 64. This combination of slots 64 and 66 give twelve possible locked settings for each 360° of rotation of nut 54 which is satisfactory for bearing adjustment.

Figure 7:
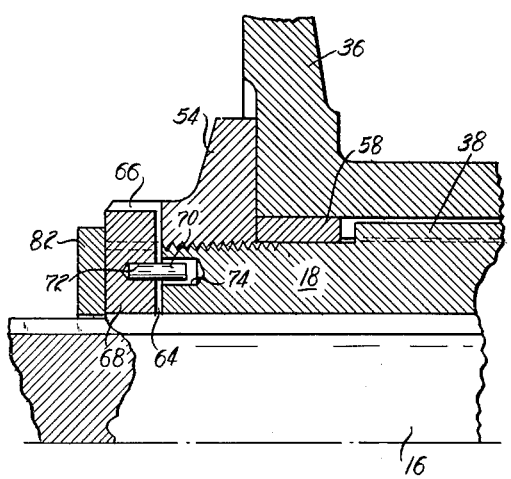
FIGURE 7 is a fragmentary sectional view similar to FIGURE 5 illustrating another nut locking means constituting a second embodiment of this aspect of the invention.

An alternate locking means is illustrated in FIGURE 7. In this alternative construction a pair of individual rectangular locking blocks 68 are inserted in the diametrically opposed pairs of radially aligned slots 64 and 66 in spindle 18 and nut 54. A pin 70, press fitted into block opening 72 of each locking block 68, extends in a loose fit in an opening 74 in the bottom of the spindle slot 64 to restrain block 68 radially and circumferentially in position while permitting enough play to assure an equal take up between the sides of a block 68 and the respective slots 64 and 66. Blocks 68 are axially confined in slots 64 and 66 by an annular retainer washer 82 on shaft 16 adjacent the end faces of spindle 18 and nut 54.

Referring again to FIGURE 1, a planetary sun gear 76 is splined at 78 to the outer end of axle shaft 16 and is axially restrained in position thereon by snap ring 80 and by washer 82. Rotation of washer 82 is prevented by a pin 84 which is riveted to the washer 82 and which projects into one of the slots 64 in the end of spindle 18. Sun gear 76 meshes with three equiangularly disposed planetary pinions 88 which are journalled on pins 92 extending between and fixed to the opposed walls of planetary pinion carrier 94. Planetary pinions 88 mesh with internal ring gear 37 which is splined at 98 to mount member 36. Ring gear 37 is held axially in place on member 36 between the radial shoulder defined by the end faces 100 of the gear teeth and annular washer 102 held in place on the end of ring gear 37 by bolts 104.

In operation, when planetary pinions 88 load ring gear 37 the splines 98 permit slight resilient deformation of gear 37 from its normal circular shape toward an arcuate triangulated shape rather than to bell mouth ring gear 37 as would be the case if gear 37 were formed integral with mount member 36.

Carrier 94 is fastened to wheel hub member 44 by stud and nut assemblies 106 and forms an apertured end plate which is closed by hub end plate 108 and bolts 109 to provide with wheel hub member 44 a completely enclosed housing 110 for the axle outer end planetary gearing and wheel support bearings 30 and 40. A die cast oil seal retainer 112, which is press fitted into opening 46 of wheel hub 44 and an oil seal 114 which is retained thereby and which is in annular contact with surface 116 of spindle 18, effectively precludes loss of oil from housing 110 along the exterior of spindle 18 into brake assembly 28. A frusto conical shield 118 is mounted on wheel hub 44 in surrounding relation thereto and to seal 114 to intercept any oil that may seep past oil seal 114 and this prevents contamination of brake assembly 28. Any oil accumulating on the interior of shield 118 will be carried by centrifugal force away from brake 28. Other oil seal constructions may be used in place of retainer 112 and oil seal 114. An oil seal 120 mounted in opening 122 of axle housing 14 is in annular sealing contact with surface 124 of axle shaft 16 to limit loss of oil from housing 110 into axle housing space 126.

The apertured outer wall 128 of pinion carrier 94 coacts with hub plate 108 to form an annular pocket 130 which collects oil discharged axially outwardly from the planetary gearing 12. Communicating openings 132 and 134 are provided in each planetary gear pin 92 to permit flow of lubricating oil to the bearing surfaces of planetary pinions 88 on the pins 92 from annular pocket 130. An abutment pin 136, having a head 138 and a stem 140 fixed in bore 142 of plate 108, is fixed on plate 108 in axial alignment with shaft 16 to limit outward axial displacement of axle shaft 16. Wheel disc 144 is mounted on flange 146 of wheel hub member 44 by stud and nut assemblies 148. Wheel rim assembly 150 is welded 152 to wheel disc 144. Brake drum 154 of brake assembly 28 is fastened to shoulder 156 of wheel hub member 44 by bolts 158.

Figure 2:
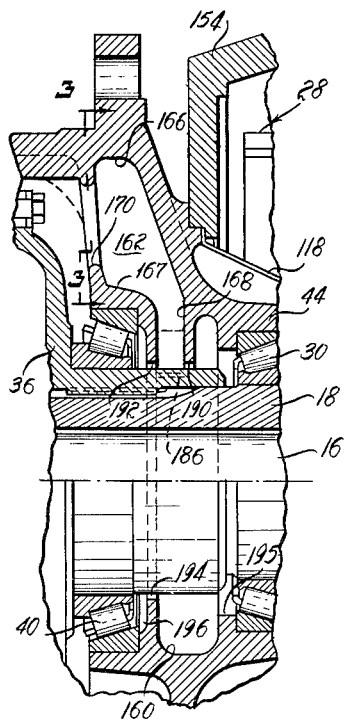
FIGURE 2 is an enlarged fragmentary detail view of the wheel bearing portion of an axle end.
Figure 4:
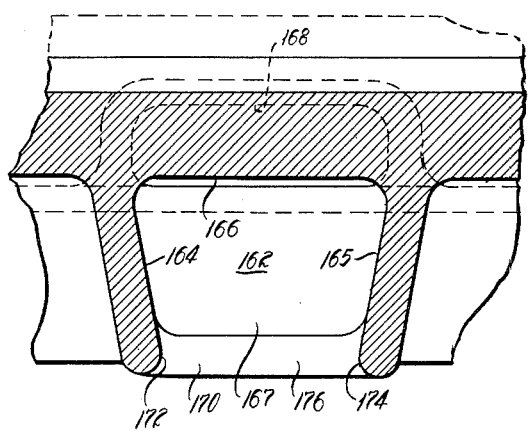
FIGURE 4 is a fragmentary sectional view taken along line 4—4 of FIGURE 3 illustrating oil channel detail.
Figure 3:
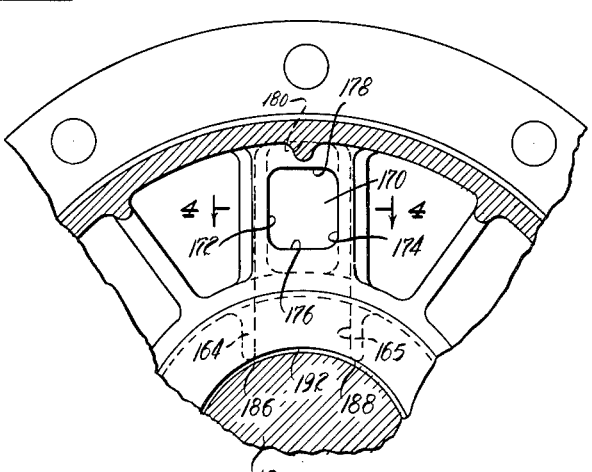
FIGURE 3 is a fragmentary sectional view along the line 3—3 of FIGURE 2 illustrating oil opening and channel detail for supplying oil to the wheel bearings.

Referring to FIGURES 2 to 4, between bearings 30 and 40, wheel hub member 44 is formed with an annular oil retaining groove 160. An oil inlet passage 162 is formed in wheel hub 44, being defined by side walls 164 and 165 and by outside and inside walls 166 and 167. Extended portions of side walls 164 and 166 are the sides in channel 168 of cavity 162 which extends radially inward to annular groove 160. Cavity 162 is provided with axially facing opening 170 which is framed by opening edges 172 and 174 respectively of side walls 164 and 166, by radially inward lip 176 and by radially outward lip 178. Lip 178 is of such a height that, when wheel hub member 44 is rotated so that opening 170 passes through the low portion of its rotational path of movement, oil flows from the surface of a pool of oil maintained in the lower portion of the chamber defined by hub 44, carier 94 and plate 108 over lip 178 into basin 180 behind lip 178. Sidewalls 164 and 165 converge toward opening 170 to prevent escape of oil from the inlet cavity of passage 162 back through opening 170 as the cavity 162 is rotated upwardly from its bottom most position through a position in horizontal relation with the shaft 16. The foregoing structure defines a scoop for picking up oil from the bottom of housing 110 and delivering it to groove 160.

In operation when wheel member 44 is rotated and opening 170 passes through the upper most portion of its path of movement, oil that entered basin 180 when the opening 170 was near its bottom dead center position, flows by gravity through channel 168 and into annular groove 160. Channel 168 extends radially inward sufficiently far that channel end lips 186 and 188 (FIGURE 3) of side walls 164 and 165 respectively and channel end lips 190 and 192 limit return flow of oil from annular groove 160 back through channel 168 to cavity basin 180 when passage 162 again returns to its bottom dead center position. Annular shoulder 194, which is a continuation of and of equal radius as channel lip 192 forms a radially extending wall for groove 160 adjacent bearing 40 retains sufficient oil in groove 160 at all times to assure oil flow over the end edge of annular shoulder 195 to lubricate bearing 30 and additional oil flowing over the annular shoulder 194 into annular space 196 to lubricate bearing 40. This is a continuation of my pending application Serial No. 625,095 filed November 29, 1956, now abandoned.

From the foregoing it is apparen that there is hereby provided a new improved axle planetary gear outer end with means for proper wheel bearing lubrication. It provides means whoch takes oil from the surface of oil in the axle outer end planetary gear housing to supply oil to the wheel bearings and which prevents reverse oil flow from the space between the wheel bearings. It provides a new improved single nut threaded on an axle housing spindle for wheel bearing adjustment which also holds an internal ring gear hub on the spindle and a new improved locking means for locking the nut in the adjusted position on the axle housing spindle. It also provides a two piece internal planetary ring gear and hub mount construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In a drive axle assembly, an axle housing, a closed outer end wheel hub rotatably mounted on the outer end of said housing and enclosing a gear chamber adapted to contain fluent lubricant, an axle shaft rotatable within the axle housing and extending into said chamber, a sun gear on said shaft within said chamber, an internal ring gear mounted on said axle housing and disposed within said chamber so as to be partly immersed in lubricant, a planet gear carrier rotatable with said hub and disposed within said chamber, a plurality of planet gear shafts on said carrier and planet gears mounted in bearings on said planet gear shafts meshed with both the ring gear and sun gear, means within the outer end of said hub forming an axially inwardly open annular lubricant receiving pocket for receiving lubricant picked up from said chamber by said gears and discharged laterally outwardly from said gears and disposed opposite the outer ends of said planet gear shafts, and means providing lubricant passages leading from an open end opposite said pocket through said planet gear shafts to said bearings.

2. In the drive axle assembly defined in claim 1, said hub outer end being a removable plate and said pocket being formed in the inner surface of said plate coaxial with said axle shaft.

3. In a drive axle assembly, an axle housing, an axle shaft extending through the housing, a wheel hub rotatably mounted on said housing on two spaced bearings and said hub having an outer chamber, drive gearing in said chamber connecting the shaft and hub, said chamber being adapted to contain a pool of liquid lubricant in which said gearing is at least partially immersed, means in the hub defining an oil retaining chamber located between said bearings and having provision for out flow of lubricant to the respective bearings, and means in the hub wall having an inlet adapted to dip into said pool to pick up oil on rotation of the hub and an outlet open to discharge into said oil retaining chamber.

4. In the drive axle assembly of claim 3, said drive gearing comprising planetary gearing with a sun gear on the shaft, a ring gear on the housing and a planet gear carrier on the hub, each planet gear having a bearing on a shaft parallel to the axle shaft and formed with a lubricant passage for that bearing opening at the end of the planet gear shaft adjacent the outer end of the hub, and means at the outer end of said hub providing an annular lubricant pocket receiving oil from said pool and extending over the open end of each of said planet gear shafts.

5. An axle outer end assembly comprising a hollow axle housing outer end, an axle shaft projecting through said housing outer end, a wheel hub journalled on said housing outer end by spaced bearings, a planetary gear mechanism drive connecting the projecting end of said shaft and said wheel hub, means defining an enclosed liquid tight chamber enveloping the outer ends of said shaft and of said housing and said gear mechanism and bearings, said means forming a first and relatively large annular lubricant channel enveloping the periphery of said gear mechanism and a second and relatively smaller annular lubricant channel interposed between said bearings, said large channel being connected to receive lubricant passing through one of said bearings from said smaller channel, and means for pumping liquid lubricant from said first to said second channel.

6. In a drive axle, an axle shaft, an axle housing, a wheel hub journalled on said housing by spaced bearings and drive connected to said shaft, said wheel hub having a cavity formed therein defining an oil basin in the radially outermost portion of said cavity, an opening in said cavity which axially faces the interior of said wheel hub, an annular oil retaining groove between said bearings radially inward from the radially outermost portion of said cavity, a channel of said cavity extending inward from the radially outermost portion of said cavity to said annular oil retaining groove; means defining an oil pool in the wheel hub connected in fluid communication to at least one of said bearings on the side thereof axially opposed to said groove to receive oil passing from said groove through said one bearing whereby as the wheel hub rotates and said cavity passes through its bottom dead center position oil from said pool of oil passes into the oil basin of said cavity and as said cavity is withdrawn from said pool oil is fed back to said oil retaining groove.

7. In an axle outer end assembly, a wheel hub mounted for rotation upon two spaced bearings, gearing for driving said hub, means on the hub defining a sealed chamber about said gearing, said chamber being formed to provide a pool of liquid lubricant chiefly below said gearing, means defining a liquid lubricant reservoir between said bearings, means responsive to the rotation of said hub for moving liquid lubricant from said pool to lubricate said bearings comprising a receptacle rotatable with the hub and disposed within said hub having an inlet periodically immersed in and withdrawn from said pool and an outlet opening into said reservoir between said bearings to permit lubricant retained in said receptacle upon withdrawal thereof from said pool to flow to said bearings, and means providing outflow of lubricant from said reservoir to both bearings.

8. In an axle outer end assembly, an axle shaft, a wheel hub, spaced bearings journalling said hub for rotation coaxial with said shaft, means within the hub drive connecting said hub and said shaft, means within the hub defining a sealed lubricant chamber about said bearings and said drive means, said chamber defining means being adapted to provide a liquid lubricant reservoir in the bottom thereof to receive lubricant passing through at least one of said bearings, and means for supplying lubricant from said reservoir to both of said bearings for maintaining lubrication of said bearings by lubricant from said reservoir comprising internal hub wall means defining a lubricant container intermediate said bearings and scoop means alternately immersed and withdrawn from said reservoir for withdrawing a portion of the lubricant from said reservoir and feeding the withdrawn lubricant to said container while said scoop means is withdrawn from said reservoir.

9. In a drive axle, an axle shaft, an axle housing, a wheel hub journalled on said housing by spaced bearings and drive connected to said shaft, said wheel hub having a cavity formed therein defining an oil basin in an enlarged radially outermost portion of said cavity, an opening in said cavity which axially faces the interior of said wheel hub, an annular oil retaining groove between said two bearings radially inward from the enlarged radially outermost portion of said cavity, a neck channel of said cavity extending radially inward from the enlarged radially outermost portion of said cavity to said annular oil retaining groove; means defining an oil pool in the wheel hub, a lip at said opening in the cavity that extends radially inwardly sufficiently far that as the wheel hub rotates and said cavity passes through its bottom dead center position oil from the surface and near the surface of said pool of oil pass over said lip and into the oil basin of said cavity, spaced sides in said cavity, axially extended portions of said cavity sides extending to said opening, said axially extended side portions angled toward each other as they approach said opening to a sufficient degree to limit loss of oil from said cavity as the cavity is passed in revolution from its bottom to its top dead center position, said cavity neck channel terminating in lips within said annular oil retaining groove, said lips presenting a continuous edge about the neck channel outlet substantially equidistant from the rotational center of the wheel hub member, said lips at the neck channel outlet extending radially inward sufficiently far that as the wheel hub member rotates and said cavity passes through the low portion of revolutions loss of oil from said annular oil retaining groove to said cavity is minimized and an annular shoulder in said annular oil retaining groove which is a continuation of a neck channel outlet lip.

10. In a vehicle drive axle, an axle housing, a wheel hub member rotatably mounted on said axle housing on two axially spaced thrust bearings, axle shaft connected drive transmission gearing housed by an outer portion of said hub and connected to rotate said hub member, said wheel hub member having a cavity formed therein defining an oil basin in an enlarged radially outermost portion of said cavity, an opening in said cavity which axially faces the interior of the gear housing portion of said wheel hub member, means defining an annular oil retaining groove between said two bearings radially inward from the enlarged radially outermost portion of said cavity, means defining a neck channel of said cavity extending radially inward from the enlarged radially outermost portion of said cavity to said annular oil retaining groove, means defining an oil pool in said gear housing portion of the wheel hub, a lip at said opening in the cavity that extends radially inwardly sufficiently far that as the wheel hub member rotates and said cavity passes through its bottom dead center position oil from the surface and near the surface of said pool of oil pass over said lip and into the oil basin of said cavity, spaced sides in said cavity, axially extended portions of said cavity sides extending to said opening, said axially extended side portions angled toward each other as they approach said opening to a sufficient degree to limit loss of oil from said cavity as the cavity is passed in revolution from its bottom to its top dead center position, said cavity neck channel terminating in lips within said annular oil retaining groove, said lips presenting a continuous edge about the neck channel outlet substantially equidistant from the rotational center of the wheel hub member, said lips at the neck channel outlet extending radially inward sufficiently far that as the wheel hub member rotates and said cavity passes through the low portion of revolutions loss of oil from said annular oil retaining groove to said cavity is minimized and an annular shoulder in said annular oil retaining groove which is a continuation of a neck channel outlet lip.

References Cited in the file of this patent
UNITED STATES PATENTS

| | | |
|---|---|---|
| 2,386,917 | Tharnton | Oct. 16, 1945 |
| 2,408,336 | Orr | Sept. 24, 1946 |
| 2,543,811 | Snow et al. | Mar. 6, 1951 |
| 2,681,126 | Searls | June 15, 1954 |